United States Patent [19]
Hirohata et al.

[11] Patent Number: 5,250,972
[45] Date of Patent: Oct. 5, 1993

[54] DROP-IN LOADING TYPE CAMERA

[75] Inventors: Michio Hirohata, Yokohama; Minoru Tanabe, Kawasaki; Makoto Miyawaki, Yokohama; Hiroaki Maegawa, Machida, all of Japan

[73] Assignee: Canon Kabushiki Kaisha, Tokyo, Japan

[21] Appl. No.: 691,429

[22] Filed: Apr. 25, 1991

[30] Foreign Application Priority Data

| Apr. 26, 1990 | [JP] | Japan | 2-111215 |
| Apr. 26, 1990 | [JP] | Japan | 2-111216 |
| Apr. 26, 1990 | [JP] | Japan | 2-111218 |
| Apr. 26, 1990 | [JP] | Japan | 2-111219 |
| Apr. 27, 1990 | [JP] | Japan | 2-111971 |

[51] Int. Cl.⁵ ............................ G03B 1/00
[52] U.S. Cl. ..................... 354/288; 354/215; 354/203
[58] Field of Search ........... 354/173.1, 173.11, 203, 354/275, 288, 212, 215

[56] References Cited

U.S. PATENT DOCUMENTS

| 4,752,797 | 6/1988 | Sekine et al. | 354/212 |
| 4,980,712 | 12/1990 | Maeno | 354/212 |
| 5,008,693 | 4/1991 | Hirohara | 354/214 |

Primary Examiner—Michael L. Gellner
Assistant Examiner—Cassandra C. Spyrou
Attorney, Agent, or Firm—Fitzpatrick, Cella, Harper & Scinto

[57] ABSTRACT

In a drop-in loading type camera, in which a film is loaded by dropping a film cartridge in a cartridge chamber from the axial direction of the cartridge, it has holding means which obliquely holds the film cartridge until the film leader is dropped in at a position beyond the aperture so that the film leader is dropped in later than the cartridge proper when dropping the film cartridge into the cartridge chamber.

6 Claims, 11 Drawing Sheets

DROP-IN LOADING TYPE CAMERA

BACKGROUND OF THE INVENTION

1. Field of the Invention

The present invention relates to a so-called drop-in loading (hereinafter called "DL") type camera, in which a film can be loaded only by dropping a film cartridge in the cartridge chamber of a camera proper from the axial direction of the cartridge.

2. Related Background Art

Conventionally, this kind of camera has been widely known, and has been put to practical use. The present applicant has also made various proposals concerning this kind of camera.

According to U.S. patent application Ser. No. 409,387 (now, U.S. Pat. No. 5,008,693) in a camera in which a film is loaded by dropping a cartridge into the cartridge chamber form the same direction as the axial direction of the cartridge toward the opening of the cartridge chamber and the opening of a groove, into which the film leader fits, the cartridge is inserted while tilting the cartridge against the cartridge chamber through a partially notched side wall of the cartridge chamber at the initial stage of loading the cartridge. Thereafter the cartridge is allowed to correctly stand so that the film leader can be smoothly fitted into the above-mentioned groove.

In the proposal by the applicant, however, there were also the following unsolved problems.

Figure 10:
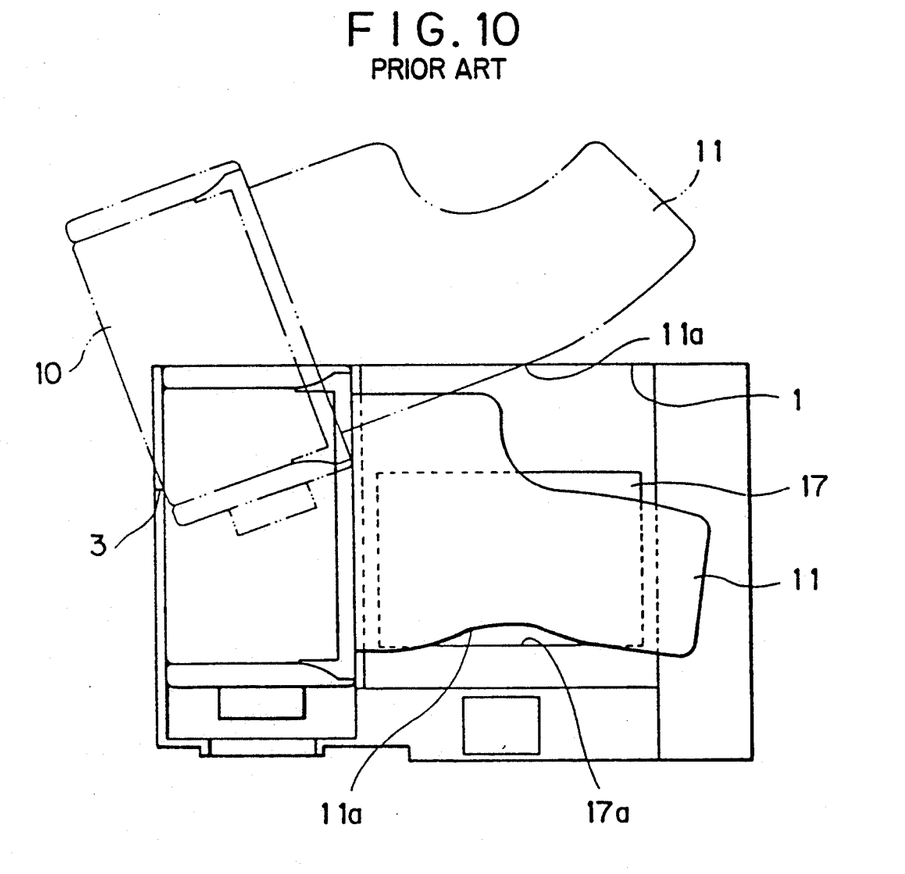
FIG. 10 is a longitudinal sectional view for the camera at the initial to intermediate stages of obliquely loading the cartridge.
Figure 11:
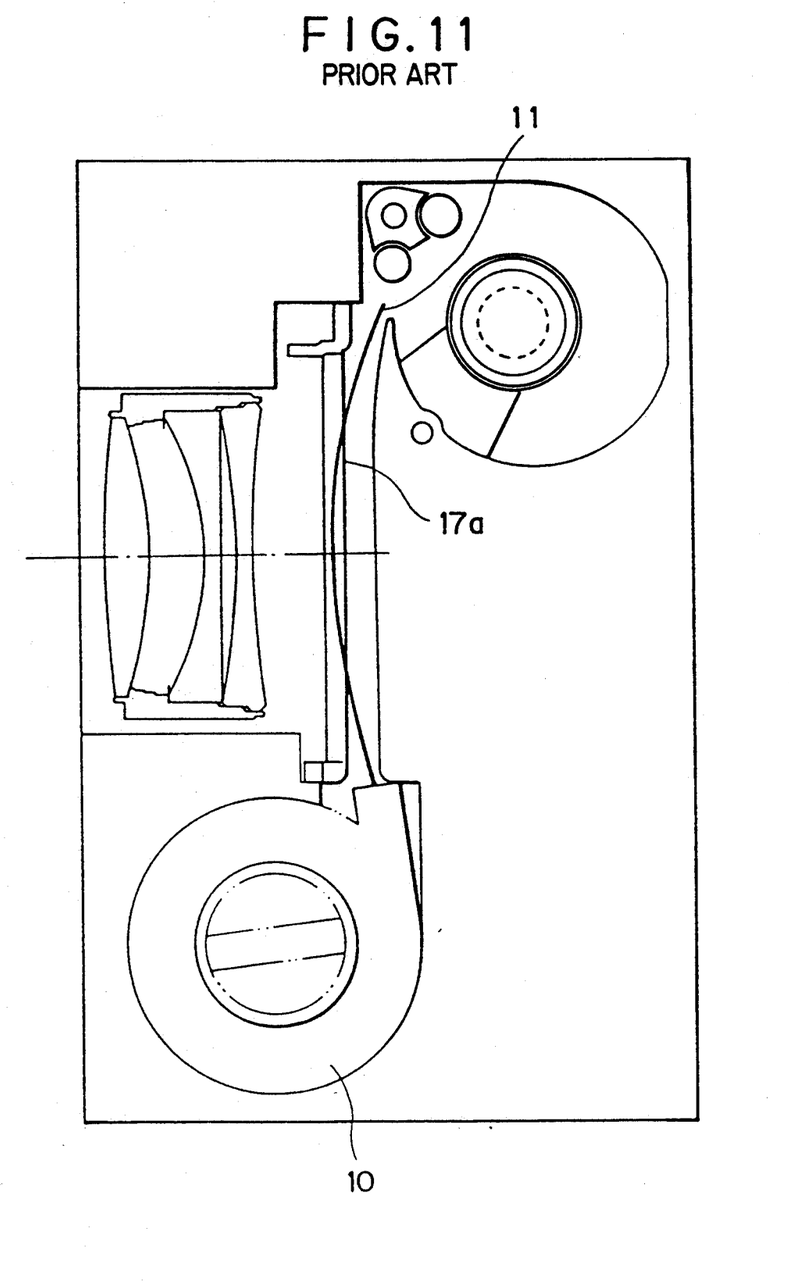
FIG. 11 is a horizontal sectional view at the intermediate stage of loading the cartridge for the camera in FIG. 10.

FIGS. 10 and 11 are a longitudinal sectional view and a horizontal sectional view, respectively, of the above-mentioned camera proposed by the applicant. At the initial stage of loading when the cartridge 10 is shown in a two-dot chain line in FIG. 10, a side end 11a of the film leader 11 binds in the camera 1 when the cartridge is obliquely inserted through the above-mentioned cartridge chamber notch 3.

Even if this binding could be corrected, since the cartridge correctly stands thereafter, the end 11a of the film leader 11 binds in an end 17a of an aperture 17 because of its curling in the latter process of loading, resulting in deformation in the film or failure to further drop the film in.

FIG. 11 is a horizontal sectional view at the time, showing that the film 11 is convexly curved toward the lens, and if it is inserted as is, it will bind in the aperture end 17a.

SUMMARY OF THE INVENTION

In view of the foregoing, it is an object of the present invention to provide a configuration whereby a film can be securely loaded with good operability in a drop-in loading type camera.

In a drop-in loading type camera, in which a film is loaded by dropping a film cartridge in a cartridge chamber from the axial direction of the cartridge, it is a further object of the present invention to provide a configuration of equipping holding means which obliquely holds the film cartridge until the film leader is dropped in at a position beyond the aperture so that the film leader is dropped in later than the cartridge proper when dropping the film cartridge into the cartridge chamber.

In a drop-in loading type camera, in which a film is loaded by dropping a film cartridge in a cartridge chamber from the axial direction of the cartridge, it is also an object of the present invention to provide a configuration of equipping energizing means for energizing the cartridge to be loaded toward the opening for loading a film in the cartridge chamber, and holding means for holding the loaded cartridge within the cartridge chamber against the energizing force of the energizing means.

In a drop-in loading type camera, in which a film is loaded by dropping a film cartridge in a cartridge chamber from the axial direction of the cartridge, it is another object of the present invention to provide a configuration of equipping an opening and closing lid for the cartridge chamber, movable positioning means, separated from the opening and closing lid, for positioning a photographing picture for the film, and interlocking means which interlocks the opening of the opening and closing lid and shunts the movable positioning means on to a position to facilitate loading a film.

In a drop-in loading type camera, in which a film is loaded by dropping a film cartridge in a cartridge chamber from the axial direction of the cartridge, it is another object of the present invention to provide a configuration of forming a film conveyance path for securely loading the film with good operability.

The other objects of the present invention will become apparent from the following description of concrete embodiments.

BRIEF DESCRIPTION OF THE DRAWINGS

FIGS. 1 to 9 show embodiments of the present invention:

FIGS. 10 and 11 show a conventional example.

DETAILED DESCRIPTION OF THE PREFERRED EMBODIMENTS

Figure 1:
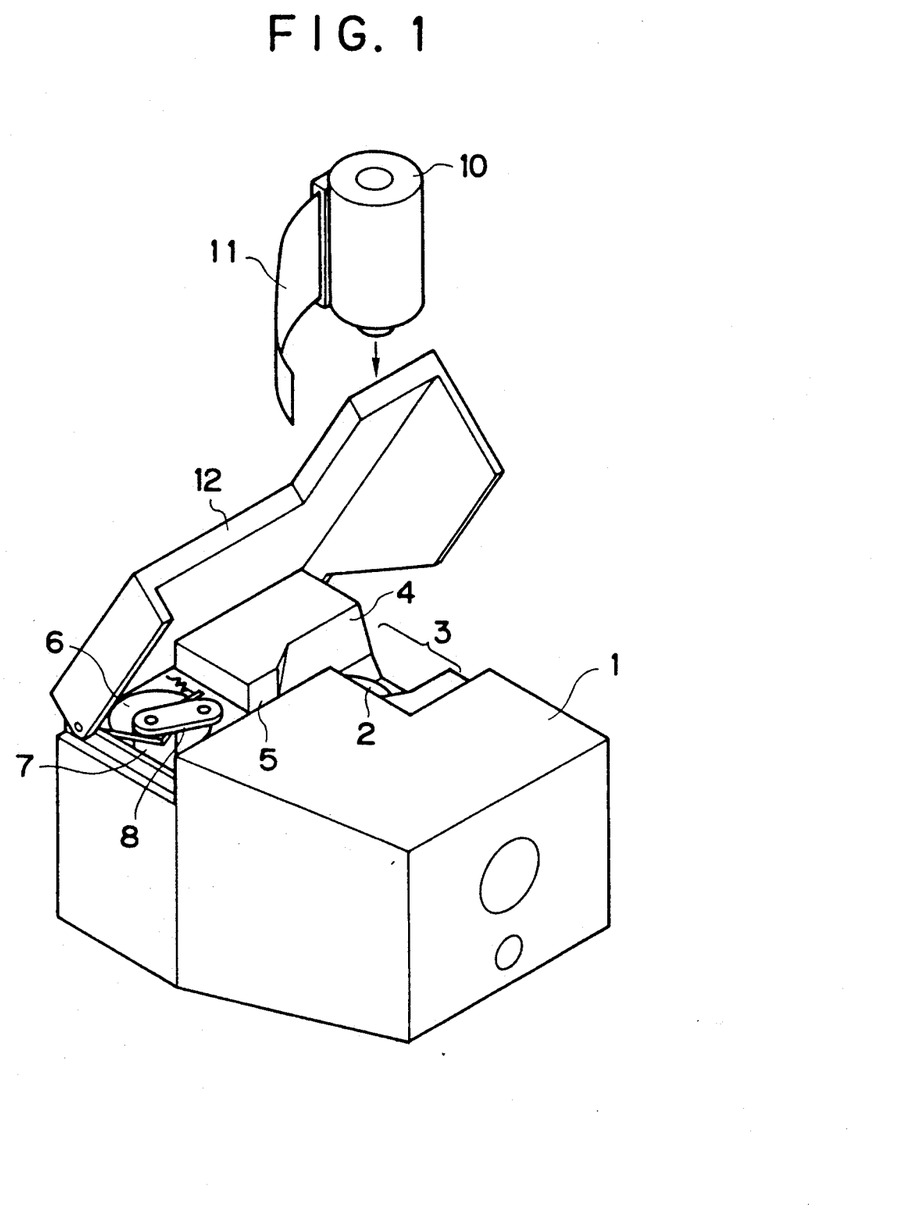
FIG. 1 is an outside perspective view obtained by turning the camera upside down, and a perspective view as the camera is viewed from the rear side.
Figure 2:
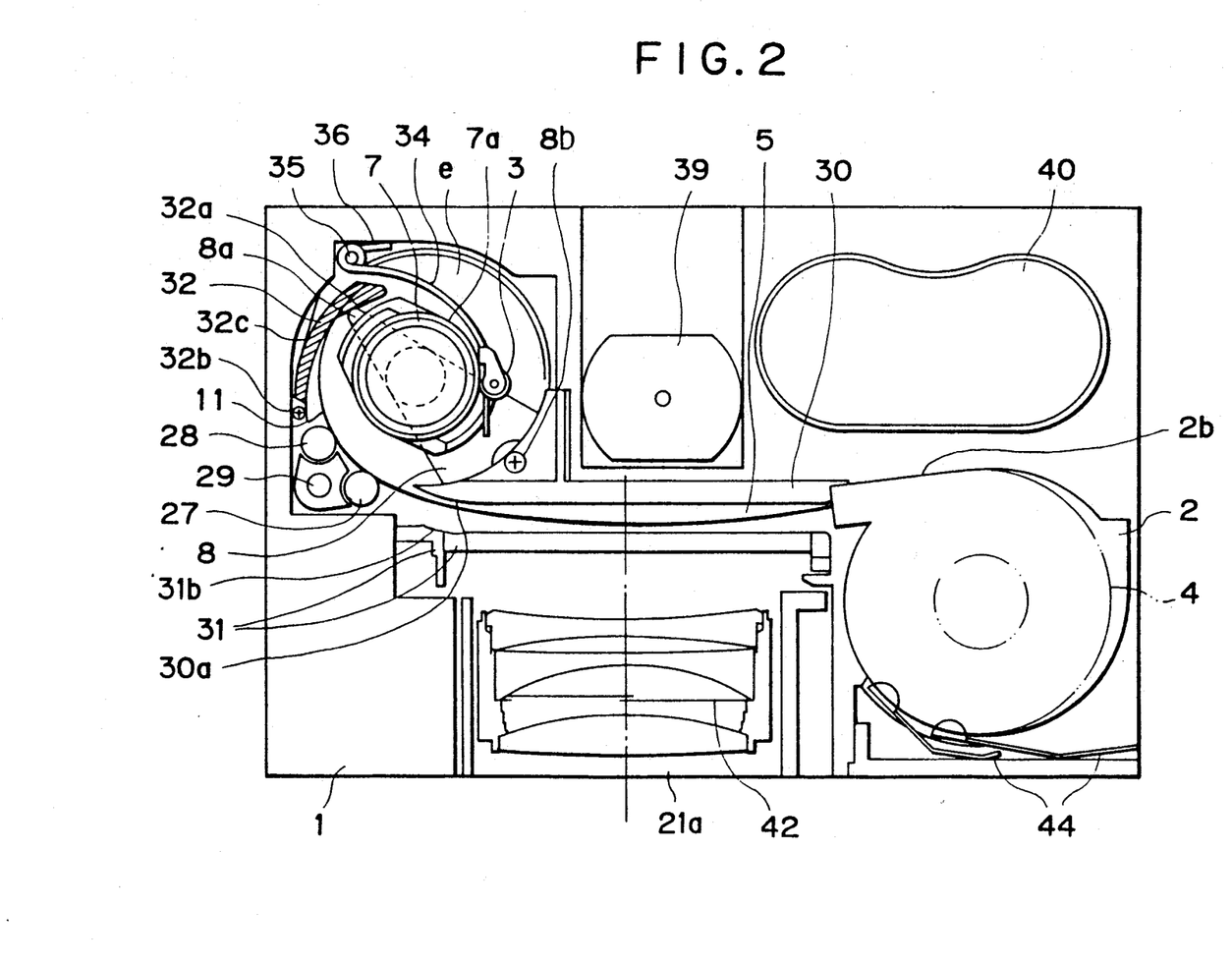
FIG. 2 is a horizontal sectional view showing a state when the bottom cover of the camera in FIG. 1 has been opened.
Figure 3:
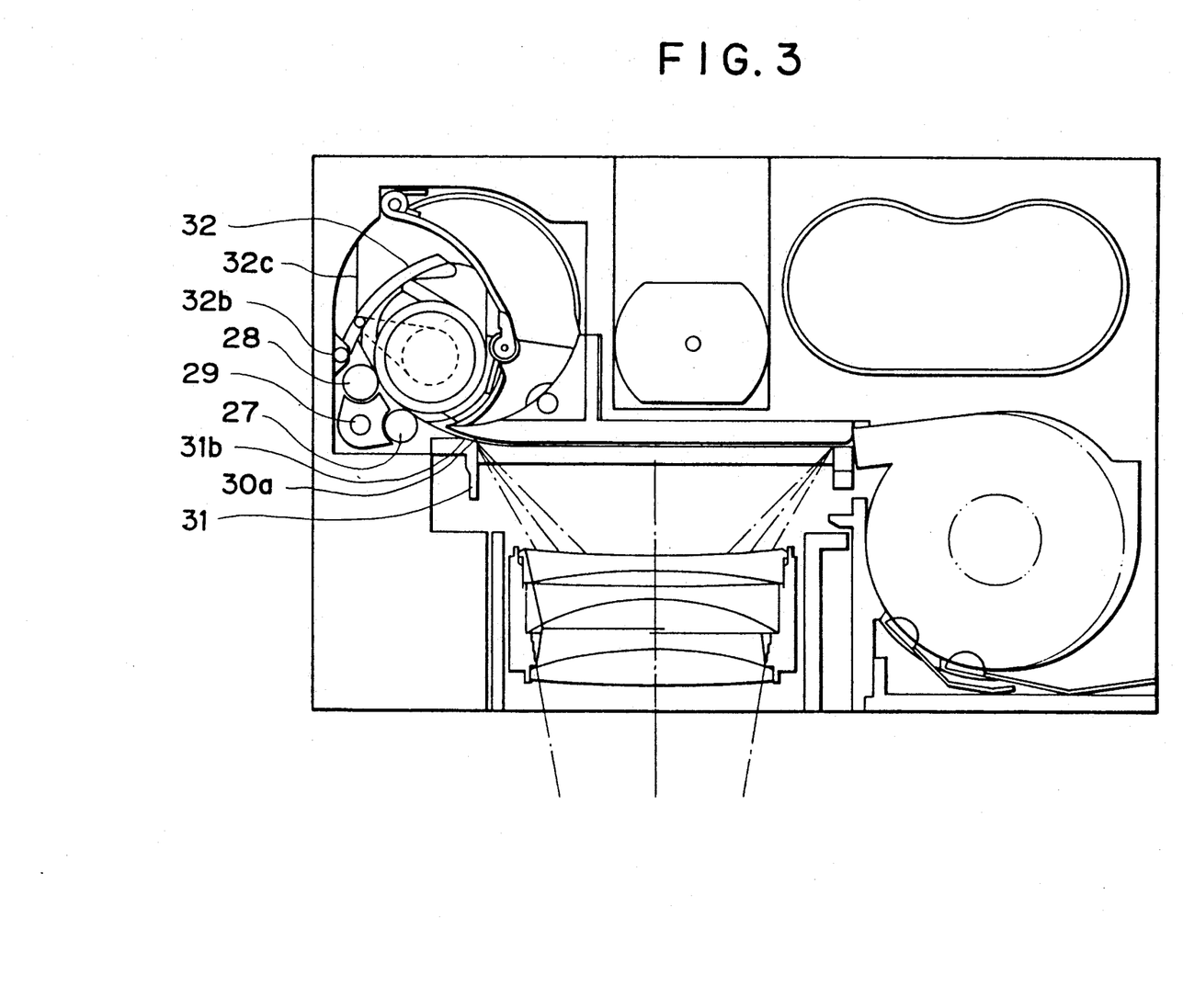
FIG. 3 is a horizontal sectional view showing a state when the bottom cover of the camera in FIG. 1 has been closed.
Figure 4:
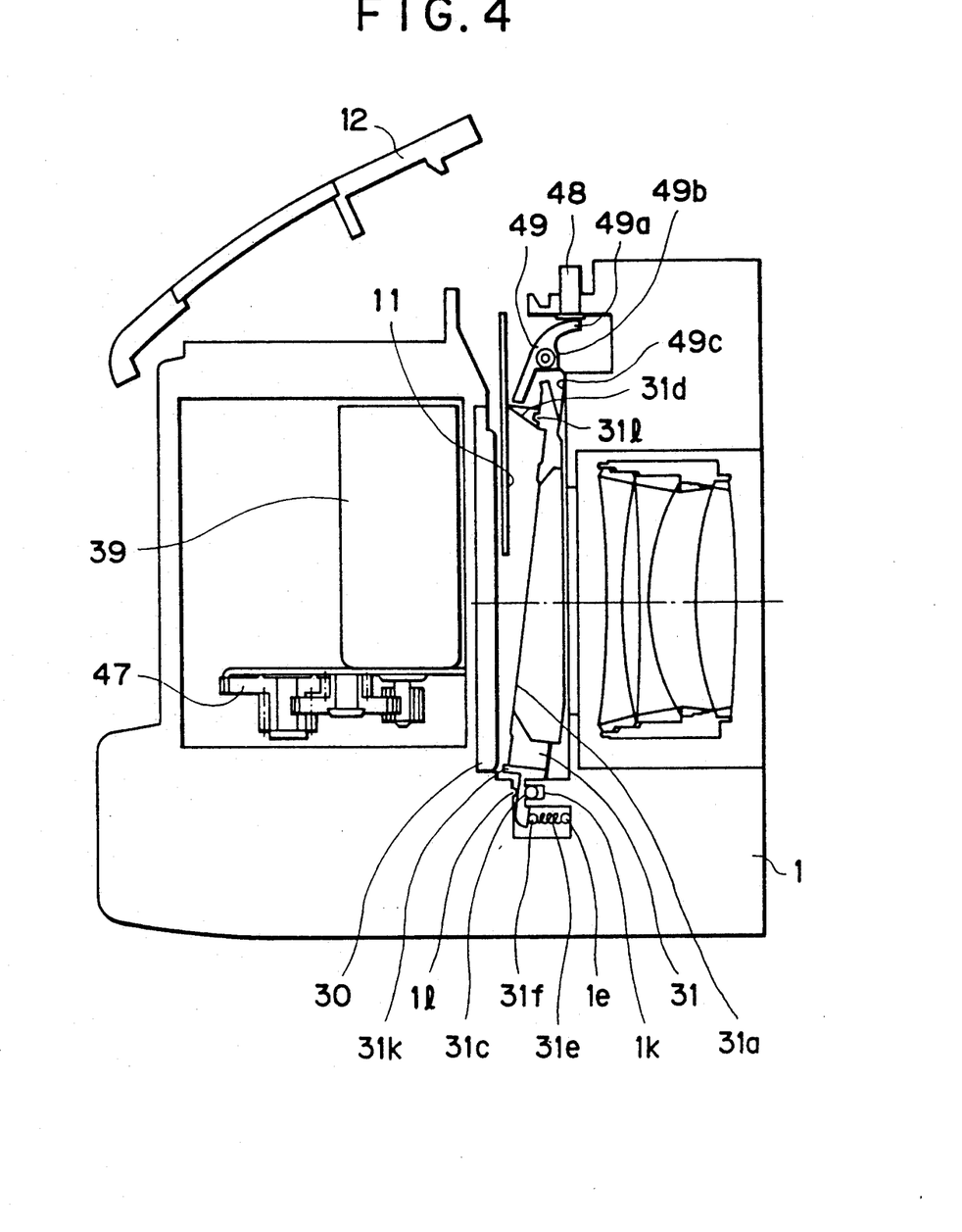
FIG. 4 is a longitudinal sectional view in the optical axis direction when the bottom cover of the camera in FIG. 1 has been opened.
Figure 5:
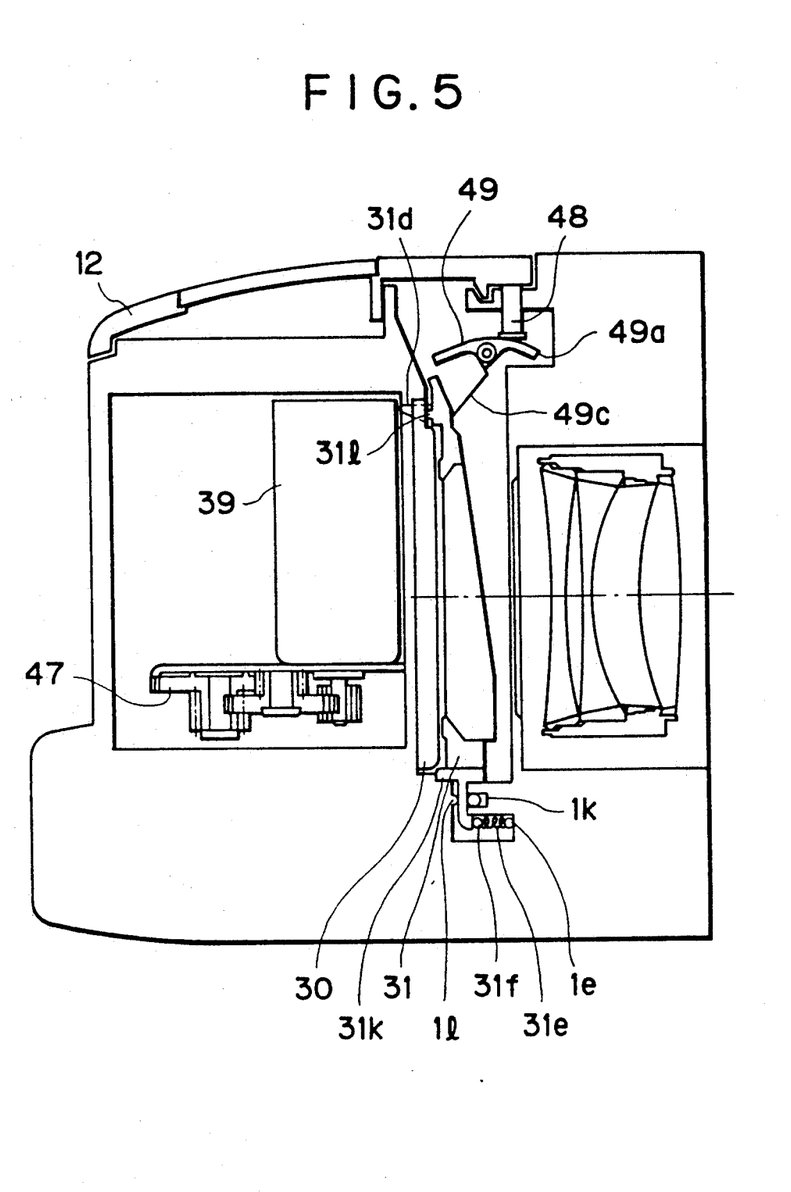
FIG. 5 is a longitudinal sectional view in the optical axis direction when the bottom cover of the camera in FIG. 1 has been closed.
Figure 6:
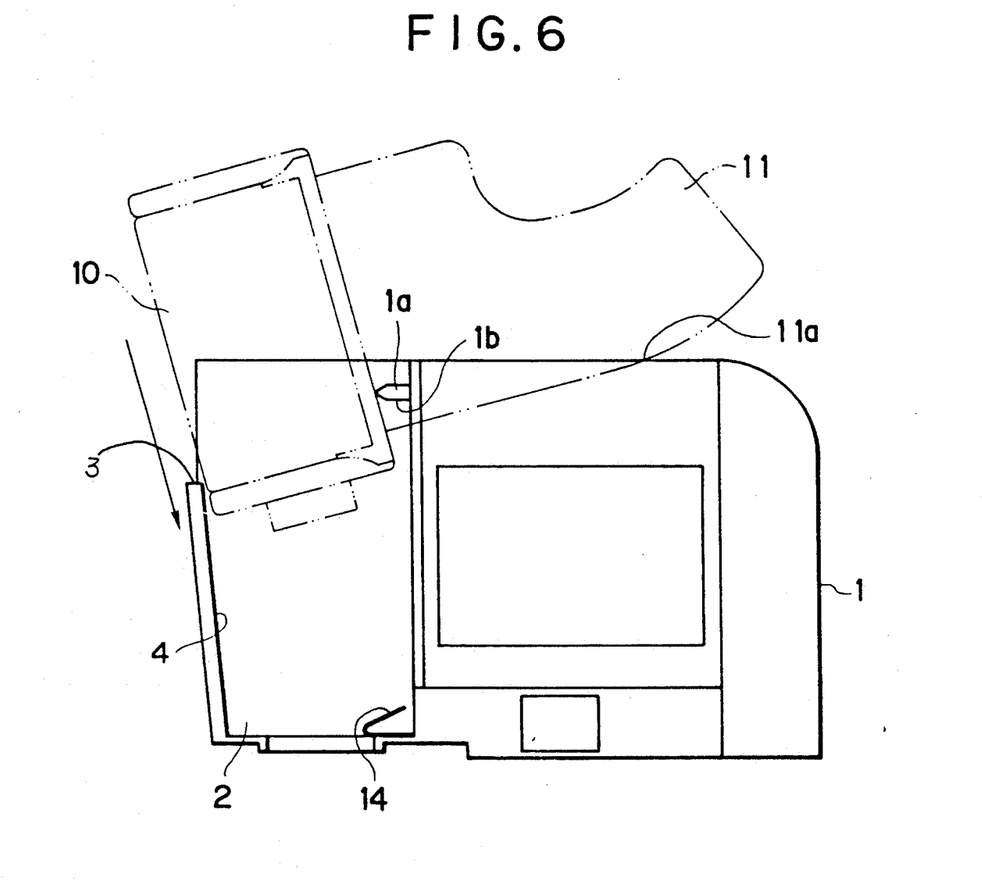
FIG. 6 is a longitudinal sectional view at the initial stage of obliquely loading the cartridge as the camera in FIG. 1 is viewed from back.
Figure 7:
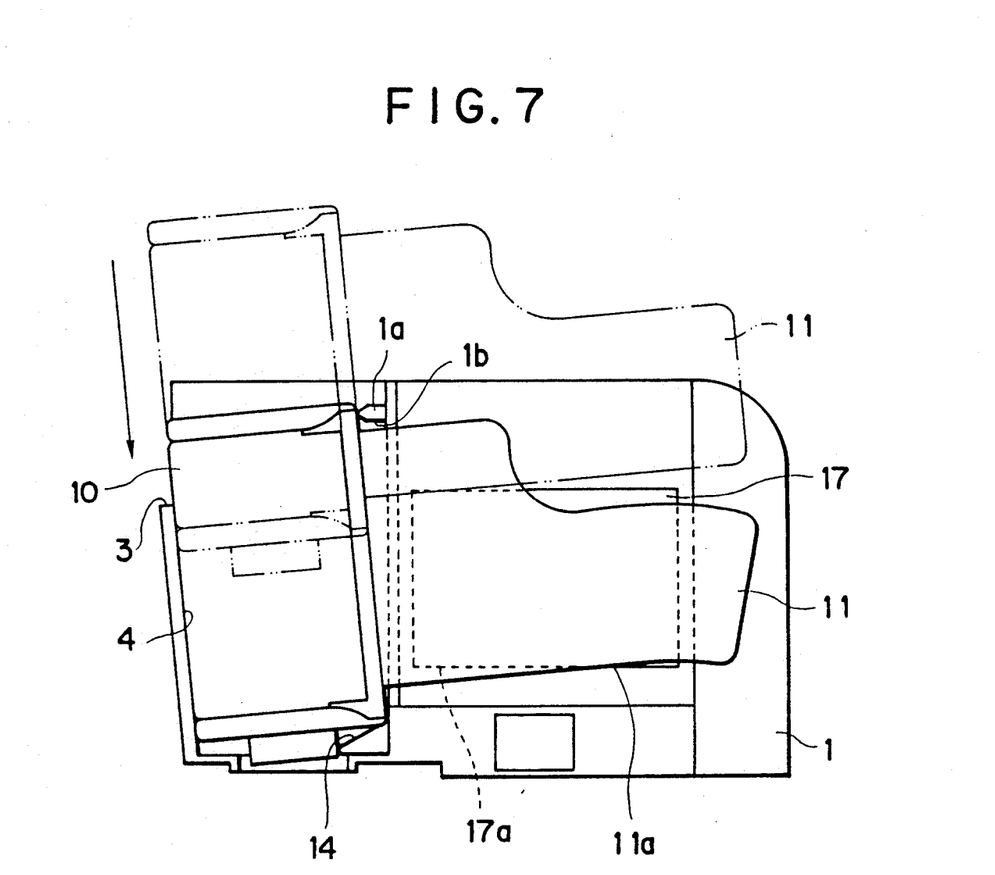
FIG. 7 is similarly a longitudinal sectional view during loading the cartridge.
Figure 8:
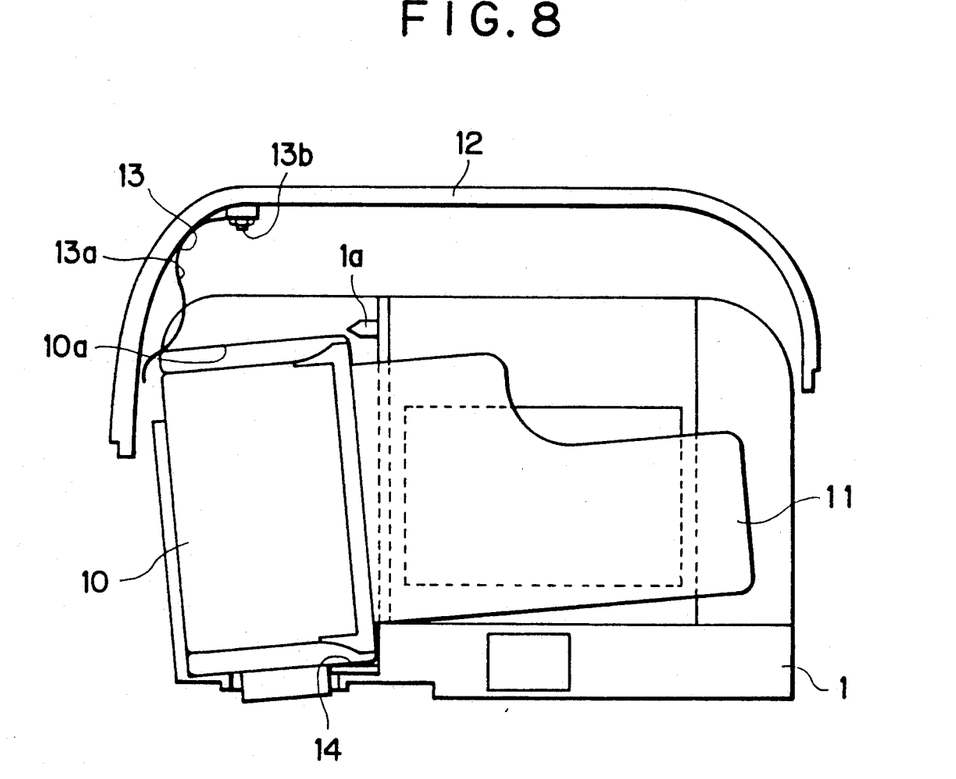
FIG. 8 is similarly a longitudinal sectional view when the bottom cover has started to be closed.
Figure 9:
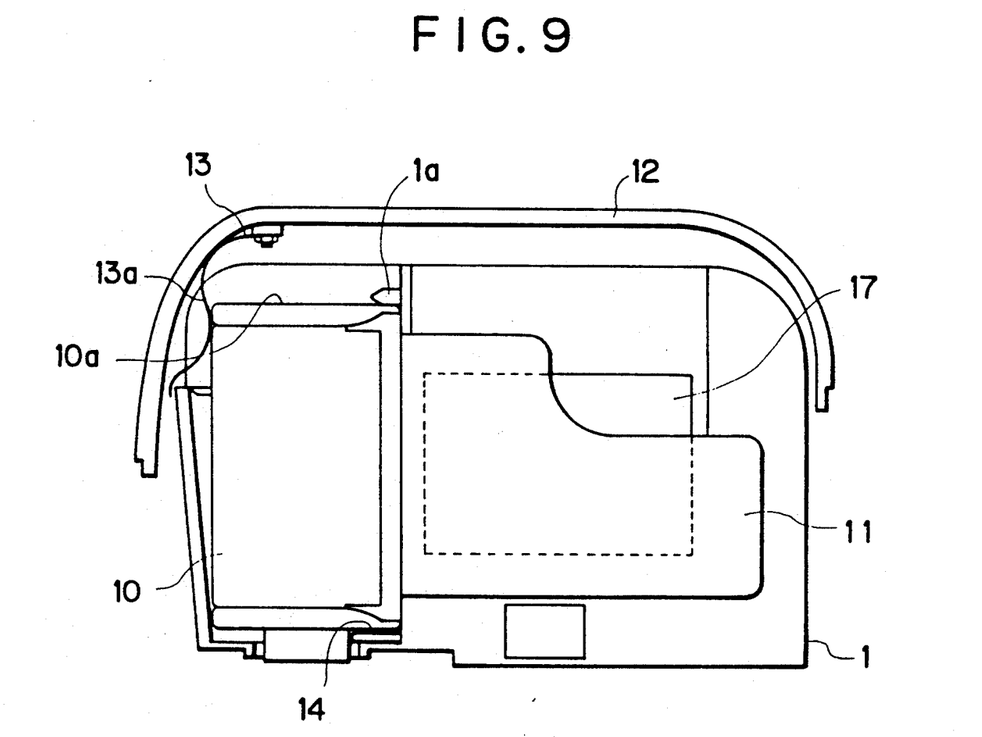
FIG. 9 is similarly a longitudinal sectional view when the cartridge has been loaded.

FIG. 1 is an outside perspective view obtained by turning upside down a camera according to an embodiment of the present invention. FIG. 2 is a horizontal sectional view showing a stage when the bottom cover of the camera in FIG. 1 has been opened. FIG. 3 is a horizontal sectional view showing a state when the bottom cover of the camera in FIG. 1 has been closed. FIG. 4 is a longitudinal sectional view in the optical axis direction when the bottom cover of the camera in FIG. 1 has been opened. FIG. 5 is a longitudinal sectional view in the optical axis direction when the bottom cover of the camera in FIG. 1 has been closed. FIG. 6 is a longitudinal sectional view at the initial stage of obliquely loading the cartridge as the camera in FIG. 1 is viewed from back. FIG. 7 is similarly a longitudinal sectional view during loading the cartridge. FIG. 8 is similarly a longitudinal sectional view when the bottom cover has started to be closed. FIG. 9 is similarly a longitudinal sectional view when the cartridge has been loaded.

In these FIGS. 1 to 9, the same symbols are affixed in the same configuration as FIGS. 10 and 11.

FIG. 1 shows a state when the camera proper 1 has been turned upside down and the bottom cover 12 for replacing a film is opened. When the bottom cover 12 is opened, the cartridge chamber 2 for housing the cartridge 10, a spool chamber 6 for housing a spool 7, and a groove 5, which forms a film conveyance path from the cartridge chamber 2 to the spool chamber 6, are respectively apertured at the bottom of the camera proper 1 so that a film can be dropped in for loading from the bottom side of the camera proper.

When the bottom cover 12 is closed, a film advance mechanism (not shown) operates to automatically perform auto loading. Since a system for winding up the film in the reverse direction is adopted, a notch, which is formed at the tip of the film leader 11, is located opposed to the bottom cover 12.

At the bottom of the camera proper 1 on the film cartridge chamber side, a notch 3, which is somewhat wider than the diameter of the film cartridge 10, is formed at a depth of about ⅓ of the cartridge chamber 2 from the cartridge chamber 2 to one side wall side of the camera proper 1, its base being at a lower level than the edge of the opening of the groove 5.

A rear wall surface 4 of the notch 3 is notched up to behind the groove 5, and an inclined surface, which expands rearward as the base is approached, is formed. This inclined rear wall surface 4 is connected with the rear wall of the groove 5 as shown in FIG. 1.

The surface of a spool 7 is covered with such a material having a high coefficient of friction, such as rubber 7a, as shown in FIG. 2, and its normal axis is supported by spool levers 8. These spool levers 8 are so constructed that they rock clockwise and counterclockwise around a revolving shaft 8b. In a spool chamber 6, on the other hand, a first roller 27 and a second roller 28 are provided opposed to the spool 7, and these rollers are rotatably supported on a frame body which rocks around a roller supporting shaft 29.

The spool levers 8 are energized to the rollers 27 and 28 sides by a spring (not shown), and when the bottom cover 12 is closed, the spool 7 rotates counterclockwise to shift to the first and second rollers 27 and 28 side as shown in FIG. 3. When the bottom cover 12 is opened, the spool levers 8 rotate clockwise to separate from the first and second rollers 27 and 28, and also to rotate a film guide plate 32 as mentioned later in such a direction as to separate from the spool 7.

A film guide plate 32 guides the film when loading the film, and is concavely curved toward the spool 7 as shown in FIG. 2, and its one end is rotatably mounted to the main body 1 through a revolving shaft 32b. A portion of the film guide plate 32 facing the spool 7 is provided with a cam 32a. A pin 8a formed at the tip of the spool lever 8 abuts this cam 32a. Accordingly, when the spool lever rocks, the pin 8a operates the cam 32a to rock the film guide plate 32 round the shaft 32b. The film guide plate 32 is energized to the spool 7 side by a leaf spring 32c.

A roller plate 34 is located opposed to the first and second rollers 27 and 28, and is mounted to the main body 1 with a roller plate shaft 35. This roller plate 34 is spring-loaded on the spool side by a spring 36, and a third roller 33 abutting the spool 7 is rotatably mounted to its tip.

In FIGS. 2 to 4, a film hold-down mechanism consisting of a fixed pressure plate 30 secured to the main body and a movable picture frame 31, which moves and rocks, is located opposed to a photographing opening 21a or a shutter 42. This film hold-down mechanism holds the film during that period, and for this purpose, a convex inclined portion 30a is formed facing the film at the end of the fixed pressure plate 30 facing the film 11 as shown in FIG. 2. On the fixed pressure plate 30, a material, which is difficult to cause a damage to the film base surface, such as plastic, is molded in the form of a plate.

A movable picture frame 31 is provided opposed to the fixed pressure plate 30, and stoppers 31k and 31l projecting on the fixed pressure plate side are formed at its top and bottom as shown in FIGS. 4 and 5, and an inclined portion 31d for guiding the film is provided at the lower portion (upper portion in FIGS. 4 and 5). It looks like a frame as a whole.

The movable picture frame 31 formed as mentioned above is mounted at its lower end with a revolving shaft 31c in such manner as to be freely rotatable or rockable in FIGS. 4 and 5. That is, this revolving shaft 31c is supported by a U-shaped groove 1k formed at the main body 1 and a stopper 1l which has been formed opposed so that it projects on the groove 1k side.

Since, therefore, it is able to rock around the revolving shaft 31c and also the revolving shaft 31c is able to move within the U-shaped groove 1k, the movable picture frame 31 can also move toward the fixed pressure plate. To perform the above-mentioned rocking or movement, the following two springs are provided.

That is, pins 31f and 31e are provided between the upper end (lower end in FIGS. 4 and 5) of the movable picture frame 31 and the main body, and these pins are provided with a return spring 31e as the first spring. Since the return spring 31e has been provided while compressed, it presses the movable picture frame 31, and the frame 31 rocks with the stopper 1l as the fulcrum. When the bottom cover 12 has been opened, the frame 31 separates from the fixed pressure plate 30. This state is shown in FIG. 4.

Also as the second spring, a hold-down spring 49c is provided between a revolving lever 49, which is freely rotatable with a revolving shaft 49b, and the movable picture frame 31 in the lower portion (in the upper portion in FIGS. 4 and 5) of the main body 1. This hold-down spring 49c is far weaker than the return spring 31e.

Accordingly, when the revolving lever 49 is free, that is, the bottom cover 12 has been opened, the movable picture frame 31 separates from the fixed pressure plate 30 as shown in FIG. 4.

In the lower portion (in the upper portion in FIGS. 4 and 5) of the main body 1, a pin 48, which presses an operating unit 49a of the revolving lever 49, is provided in such manner as to freely appear or disappear. This pin 48 is so constructed that it projects or retracts by opening or closing the bottom cover 12.

In FIG. 6, a projection 1a, which projects at the top edge of the cartridge chamber 12 as holding means, makes it impossible to straight load the cartridge 10 from the bottom of the camera (that is, the cartridge 10 is only allowed to load from diagonally above on the left in FIG. 6). Also an abutment 1b on its rear side abuts the loaded cartridge 10 when it is pressed up by a leaf spring 14 provided at the bottom of the cartridge chamber 12, so that the loaded cartridge 10 is positioned in the vertical direction.

A height of pressing up the cartridge 10 by the spring 14 is so set that the top end of the cartridge is at least higher than the projection 1a. A side wall 4 of the cartridge chamber is an inclined wall which is downward inclined at about five degrees outward. The cartridge chamber is outward opened in this way together with the projection 1a so that the cartridge 10 is always inserted obliquely, and its depth is set to such a size as to just accommodate the cartridge so that no looseness occurs when the cartridge 10 correctly stands. Also, at the end of the projection 1a, an inclined surface each is formed on the upper and lower surfaces.

As shown in FIG. 9, the bottom cover 12 is provided with a leaf spring 13, fastened with machine screws, for holding down the cartridge, and this leaf spring 13 forms a bend 13a.

The operation of the above configuration will be described below.

When the bottom cover 12 is first opened as shown in FIG. 1 to load a film, the cartridge chamber 2, which is spread out toward the camera base side, is exposed. Since the movable picture frame 31 is located apart from the fixed pressure plate 30 because of forward energizing of a return spring 31e, the camera user inserts the cartridge 10 into the cartridge chamber 2 from the camera base side as shown in FIG. 2 in a state in which the film leader 11 has been drawn out from the cartridge 10 by a specified length, that is, such a length that the tip of the film leader 11 can be held between the rollers 27 and 28, and the peripheral surface of the spool 7 covered with rubber 7a.

Then the camera user inserts the film leader 11 between the film rail surface of the movable picture frame 31 and the fixed pressure plate 30, and further runs the tip of the film leader 11 along the peripheral surface of the spool 7.

When loading this cartridge 10, since it cannot straight drop into the cartridge chamber 2 by the operation of the projection 1a as shown in FIG. 6, the cartridge 10 enters along the notch 3 from the lateral direction. Since the base of the notch 3 is at a lower level than the edge of the opening of the groove 5, the side edge of the film leader 11 abuts the groove 5, and the cartridge 10 comes into such a condition as it naturally leans.

At this time, only a point 11a at the upper edge of the film leader 11 abuts the edge of the opening of the groove 5, and the film leader beyond the point 11a sticks out outward from the camera main body base in an outwardly curled state, and also a portion of the cartridge 10 is protruding from the camera main body 1.

Pressing in the cartridge 10 still under this condition allows it to obliquely drop toward the deepmost portion along the inclined wall 4. Since the point 11a on the side of the leader abuts the edge of opening in the groove, a force for pressing the cartridge concentrates on the point 11a, and the leader is so easily deformed and corrected that it smoothly fits into the groove.

Thereafter, when the film leader 11 is passing through on the aperture 17 as shown in FIG. 7, a portion of the film may drop into the aperture owing to bulge, etc. due to curling. Since, however, the film side end 11a is also obliquely dropping at this time, it passes through the aperture 17 while any bulge, etc. of the film is smoothly deformed and corrected without binding in an end 17a of the aperture 17 for the same principle as during the above-mentioned insertion, and the cartridge 10 reaches near the deepmost portion of the main body.

Then the cartridge 10 abuts the leaf spring 14 provided on the main body base, but the cartridge 10 is still inclined due to the projection 1a at this time.

Then when starting closing the bottom cover 12 as shown in FIG. 8, the bend 13a of the leaf spring 13 provided on the bottom cover 12 first abuts a top end 10a of the cartridge 10 to charge the leaf spring 14 by also pressing downward at the same time while pressing the inclined cartridge 10 in the lateral direction.

When further closing the bottom cover 12, the cartridge 10 lowers, its top end 10a passes through the projection 1a, and rotates clockwise to correctly stand as shown in FIG. 9. At the same time, the film leader 11 also rotates and lowers to the deepmost portion of the groove.

At this time, the movable picture frame 31 inserts the pin 48, and presses the film 11 against the fixed pressure plate 30 side by the revolution of the revolving lever 49 and the operation of a hold-down spring 49c to hold the photographing surface. Even if the film vertically slips somewhat at this time, the film is completely dropped in guided by an inclined surface 31d.

Thereafter, a spring (not shown) rotates the spool 7 counterclockwise round a shaft 37b from its position in FIG. 2 to hold the film tip between the spool 7 and the rollers 27 and 28, and the film is closely adhered to the spool 7. Further rotating the bottom cover 12 in the close direction increases the film pressing force of the spool 7 against the rollers 27 and 28.

With a counterclockwise rotation of the spool lever 8, a pin 8a also rotates, and the film guide plate 32 rotates clockwise accordingly. A roller plate 34 also rotates clockwise by a roller plate spring 36 to create almost circumference-like space at the periphery of the spool 7 together with the film guide plate 32 in order to secure a passage for the film leader.

At the same time, the bend 13a of the leaf spring 13 goes beyond the top end 10a of the cartridge 10, and generates only a pressing force against the side, losing the downward pressing force. Since much friction force is designed not to occur between the side of the cartridge 10 and the bend 13a of the leaf spring 13 at this time, a repulsion force of the leaf spring 14 presses up the cartridge 10 to abut the lower surface 1b of the projection 1a. Thus the cartridge 10 is securely held by the leaf springs 13 and 14, and an abutment 1b.

When the bottom cover 12 is completely closed, a bottom cover opening and closing member (not shown) locks the bottom cover 12, and a signal for closing the bottom cover occurs from a bottom cover detection switch (not shown) to energize a motor 39 from a battery 40. The spool 7 is rotated through a transmission gear train 47 to start idle film advance.

Since the film is wound around the outer periphery of the spool 7 within a range of about 45° by the rollers 27 and 28 when the idle film advance is started, a sufficient advance force occurs to feed the film into the above-mentioned almost circumference-like space.

The film advances along the film guide plate 32 and the roller plate 34 by its curling, and is pressed against the spool 7 again by the roller 33. By a pressing force of the roller plate spring 36, the film tip obtains an advancing force again, and enters between the latter half of the leader and the spool 7 after going around the spool 7.

Since the film is then pressed by the rollers 27 and 28 again, its advancing force tightens by winding to eliminate the looseness of the film. At this time, the latter half of the film stops at one time. After tightening by winding, the film stops after idly advancing a specified length. These movements of this film are detected by a film advance detection device (not shown) to perform idle advance and frame advance.

When the idle advance is complete, the camera is ready for photographing. To assure the flatness of the film in such a reverse winding-up system, a portion of the film guide rails 30a and 31b for the fixed pressure plate 30 and movable picture frame 31 is inclined in the winding direction of the spool as mentioned above.

On the other hand, as a method for holding the cartridge 10 for this type of camera, it is preferable to press rearward from the relationship between the energizing direction for the DX contact piece 44 and pressing the film rearward. Therefore, an inclination 2b (FIG. 2) is provided to slightly turn forward the film outlet in the cartridge.

A portion of the film guide rails 30a and 31b for the fixed pressure plate 30 and movable picture frame 31 is inclined as mentioned above. By allowing this inclination to meet the sagital image surface of a photographing lens, such a force as to press the film 11 against the fixed pressure plate 30 with a moderate, very weak force is generated to secure the film stability at the center of the picture and also to correct distortion of an image resulting from the lens characteristic at the periphery of the picture.

On the other hand, when the bottom cover 12 is opened to take out the cartridge 10 by rewinding the film after photographing, the cartridge 10 has been pressed against the abutment surface 1b of the projection 1a by the operation of the leaf spring 14. However, by putting the finger, etc. on the top end 10a of the cartridge 10 to rotate it counterclockwise, it can come off from the abutment surface 1b and be pressed up by the force of the leaf spring 14. Therefore, the cartridge 10 can be easily removed from the cartridge chamber.

In the above embodiment, the projection 1a is shown as holding means for obliquely holding the cartridge when loading the cartridge, but other configurations may, of course, be used so long as they perform the same operation as this projection 1a in the present invention.

The present invention is mainly applied to a drop-in loading type camera, but it goes without saying that it can be applied to other cameras.

What is claimed is:

1. A drop-in loading type camera, comprising:
    an openable cartridge chamber for receiving a film cartridge that is dropped into said cartridge chamber along an axial direction of the film cartridge; and
    holding means which holds the film cartridge obliquely with respect to the cartridge chamber until a film leader is dropped in at a position beyond an aperture so that the film leader is dropped in later than the film cartridge proper when dropping the film cartridge into said cartridge chamber;
    wherein said holding means includes a projection to be provided in said cartridge chamber.

2. The drop-in loading type camera according to claim 1, wherein said projection is provided on a side in said cartridge chamber proximate to the aperture.

3. A drop-in loading type camera, comprising:
    an openable cartridge chamber for receiving a film cartridge that is dropped into said cartridge chamber along an axial direction of the film cartridge;
    holding means which holds the film cartridge obliquely with respect to the cartridge chamber until a film leader is dropped in at a position beyond an aperture so that the film leader is dropped in later than the film cartridge proper when dropping the film cartridge into said cartridge chamber; and
    energizing means for energizing the film cartridge to be loaded in said cartridge chamber in an opening direction of said cartridge chamber, wherein said holding means includes means for holding said cartridge to be loaded within said cartridge chamber against an energizing force of said energizing means.

4. A drop-in loading type camera, comprising:
    an openable cartridge chamber for receiving a film cartridge that is dropped into said cartridge chamber along an axial direction of the film cartridge;
    holding means which holds the film cartridge obliquely with respect to the cartridge chamber until a film leader is dropped in at a position beyond an aperture so that the film leader is dropped in later than the film cartridge proper when dropping the film cartridge into said cartridge chamber;
    opening and closing means for opening and closing said cartridge chamber; and
    positioning means for positioning the film leader wherein said positioning means is released in accordance with the opening of said cartridge chamber to be performed by said opening and closing means.

5. A drop-in loading type camera, comprising:
    (a) a cartridge chamber for receiving a film cartridge which is dropped into said cartridge chamber along an axial direction of the film cartridge;
    (b) opening and closing means for opening and closing said cartridge chamber;
    (c) a positioning member for positioning a film at an aperture position in accordance with closing of said opening and closing means, wherein said positioning member is released in accordance with opening of said opening and closing means; and
    (d) spring means for abutting said positioning member, said spring means including a first spring for abutting said positioning member in a positioning member in a releasing direction, said first spring abutting said positioning member at one end portion thereof and said second spring abutting said positioning member at another end portion thereof.

6. A drop-in loading type camera according to claim 5, further comprising:
    film guiding means for moving the film in accordance with closing and opening of said opening and closing means.

* * * * *

UNITED STATES PATENT AND TRADEMARK OFFICE
CERTIFICATE OF CORRECTION

PATENT NO. : 5,250,972

DATED : October 5, 1993

INVENTOR(S) : Michio Hirohata, et al.

It is certified that error appears in the above-indentified patent and that said Letters Patent is hereby corrected as shown below:

COLUMN 1:

line 19, "form" should read --from; and
line 26, "Thereafter" should read --Thereafter,--.

COLUMN 5:

line 27, delete "each"; and
line 55, "straight drop" should read --drop straight--.

COLUMN 6:

line 9, "through on" should read --by--; and
line 41, "round" should read --around--.

UNITED STATES PATENT AND TRADEMARK OFFICE
CERTIFICATE OF CORRECTION

PATENT NO. : 5,250,972
DATED : October 5, 1993
INVENTOR(S) : Michio Hirohata, et al.

It is certified that error appears in the above-indentified patent and that said Letters Patent is hereby corrected as shown below:

COLUMN 7:

line 37, "sagital" should read --sagittal--.

COLUMN 8:

line 58, "a positioning" should read --a positioning direction and a second spring for abutting said positioning--.

Signed and Sealed this

Thirty-first Day of May, 1994

BRUCE LEHMAN

Commissioner of Patents and Trademarks